US007702105B1

(12) United States Patent
Gura et al.

(10) Patent No.: US 7,702,105 B1
(45) Date of Patent: Apr. 20, 2010

(54) ACCELERATING ELLIPTIC CURVE POINT MULTIPLICATION THROUGH BATCHED INVERSIONS

(75) Inventors: Nils Gura, Mountainview, CA (US); Stephen C. Fung, Brampton (CA); Douglas Stebila, Windsor (CA); Hans Eberle, Mountainview, CA (US)

(73) Assignee: Oracle America, Inc., Santa Clara, CA (US)

(*) Notice: Subject to any disclaimer, the term of this patent is extended or adjusted under 35 U.S.C. 154(b) by 1118 days.

(21) Appl. No.: 10/830,661

(22) Filed: Apr. 23, 2004

(51) Int. Cl.
*H04K 1/00* (2006.01)
(52) U.S. Cl. .................................... 380/255; 713/154
(58) Field of Classification Search ............... 380/255; 713/154
See application file for complete search history.

(56) References Cited

U.S. PATENT DOCUMENTS

| | | | |
|---|---|---|---|
| 6,466,668 B1 * | 10/2002 | Miyazaki et al. | 380/30 |
| 6,701,336 B1 * | 3/2004 | Shen et al. | 708/492 |
| 6,963,644 B1 * | 11/2005 | Matsuzaki et al. | 380/30 |
| 7,068,785 B2 * | 6/2006 | Perkins | 380/30 |
| 7,111,166 B2 * | 9/2006 | Dror et al. | 713/174 |
| 7,167,559 B2 * | 1/2007 | Ono et al. | 380/28 |
| 7,191,341 B2 * | 3/2007 | Paaske et al. | 713/189 |
| 7,206,410 B2 * | 4/2007 | Bertoni et al. | 380/255 |
| 7,266,577 B2 * | 9/2007 | Ikeda et al. | 708/491 |
| 7,277,540 B1 * | 10/2007 | Shiba et al. | 380/28 |
| 2003/0206629 A1 * | 11/2003 | Eberle et al. | 380/30 |
| 2004/0225885 A1 * | 11/2004 | Grohoski et al. | 713/189 |

OTHER PUBLICATIONS

Bellare et al., "Fast Batch Verification for Modular Exponentiation and Digital Signatures," 1998.*
H. Shacham and D. Boneh, "Improving SSL handshake performance via batching", in ed. D. Naccahe, editor, Proceedings of RSA 2001, vol. 2020, pp. 28-43, Springer Verlag, 2001.*
Ciricescu et al., "The Reconfigurable Streaming Vector Processor," MICRO-36'03, 2003.*
H. Cohen, A. Miyaji, and T. Ono, "Efficient elliptic curve exponentiation using mixed coordinates", in K. Ohta and D. Pei, editors, Advances in Cryptology ASIACRYPT 98, pp. 51-65, Springer Verlag, 1998, LNCS 1514.
D. Hankerson, J. L. Hernandez and A. J. Menezes, "Software implementation of elliptic curve cryptography over binary fields", in Cryptographic Hardware and Embedded Systems—CHES 2000, Springer LNCS 1965, pp. 1-24, 2000.
J. Lopez, R. Dahab, "Fast multiplication on elliptic curves over $GF(2^m)$ without precomputation", in CHES '99 Workshop on Cryptographic Hardware and Embedded Systems, Springer Verlag, Lecture Notes in Computer Science 1717, pp. 316-327, Aug. 1999.
H. Shacham and D. Boneh, "Improving SSL handshake performance via batching", in ed. D. Naccache, editor, Proceedings of RSA 2001, vol. 2020, pp. 28-43, Springer Verlag, 2001.

* cited by examiner

*Primary Examiner*—Kambiz Zand
*Assistant Examiner*—Monjour Rahim
(74) *Attorney, Agent, or Firm*—Robert C. Kowert; Meyertons, Hood, Kivlin, Kowert & Goetzel, P.C.

(57) ABSTRACT

Executing multiple elliptic curve cryptography (ECC) point multiplications in parallel and using batched inversions allows shared computations between independent ECC operations. The point multiplications may be computed over prime integer fields or over binary polynomial fields. The batched inversion may be shared between point additions and point doublings, between point additions, or between point doublings. The batched inversions are applicable to point multiplications using projective or using affine coordinate systems.

21 Claims, 8 Drawing Sheets

|  | Point Addition | Point Doubling |
|---|---|---|
|  | $R(x_3, y_3) = S_1(x_1, y_1) + S_2(x_2, y_2)$ | $R(x_3, y_3) = 2S(x_1, y_1)$ |
| Prime Integer Fields | | |
|  | $x_3 = \left(\dfrac{y_2 - y_1}{x_2 - x_1}\right)^2 - x_1 - x_2$ | $x_3 = \left(\dfrac{3x_1^2 + a}{2y_1}\right)^2 - 2x_1$ |
|  | $y_3 = \left(\dfrac{y_2 - y_1}{x_2 - x_1}\right)(x_1 - x_3) - y_1$ | $y_3 = \left(\dfrac{3x_1^2 + a}{2y_1}\right)(x_1 - x_3) - y_1$ |
| Binary Polynomial Fields | | |
|  | $x_3 = \left(\dfrac{y_2 + y_1}{x_2 + x_1}\right)^2 + \dfrac{y_2 + y_1}{x_2 + x_1} + x_1 + x_2 + a$ | $x_3 = \left(\dfrac{y_1}{x_1} + x_1\right)^2 + \dfrac{y_1}{x_1} + x_1 + a$ |
|  | $y_3 = \left(\dfrac{y_2 + y_1}{x_2 + x_1}\right)(x_1 + x_3) + x_3 + y_1$ | $y_3 = \left(\dfrac{y_1}{x_1} + x_1\right)(x_1 + x_3) + x_3 + y_1$ |

Figure 1

| Step | Point Addition 1 | Point Addition 2 | Point Addition 3 | Point Addition 4 |
|---|---|---|---|---|
| 1 | $h_{1,1} = x_{2,1} - x_{1,1}$ | $h_{1,2} = x_{2,2} - x_{1,2}$ | $h_{1,3} = x_{2,3} - x_{1,3}$ | $h_{1,4} = x_{2,4} - x_{1,4}$ |
| 2 | $h_{2,1} = h_{1,1} h_{1,2}$ | | $h_{2,2} = h_{1,3} h_{1,4}$ | |
| 3 | | $h_3 = h_{2,1} h_{2,2}$ | | |
| 4 | | $h_4 = \dfrac{1}{h_3}$ | | |
| 5 | $h_{5,1} = h_4 h_{2,2}$ | | $h_{5,2} = h_4 h_{2,1}$ | |
| 6 | $h_{6,1} = h_{5,1} h_{1,2} = \dfrac{1}{h_{1,1}}$ | $h_{6,2} = h_{5,1} h_{1,1} = \dfrac{1}{h_{1,2}}$ | $h_{6,3} = h_{5,2} h_{1,4} = \dfrac{1}{h_{1,3}}$ | $h_{6,3} = h_{5,2} h_{1,3} = \dfrac{1}{h_{1,4}}$ |
| 7 | $h_{7,1} = y_{2,1} - y_{1,1}$ | $h_{7,2} = y_{2,2} - y_{1,2}$ | $h_{7,3} = y_{2,2} - y_{1,2}$ | $h_{7,4} = y_{2,2} - y_{1,2}$ |
| 8 | $h_{8,1} = h_{6,1} h_{7,1}$ | $h_{8,2} = h_{6,2} h_{7,2}$ | $h_{8,3} = h_{6,3} h_{7,3}$ | $h_{8,4} = h_{6,4} h_{7,4}$ |
| 9 | $h_{9,1} = h_{8,1}^2$ | $h_{8,2} = h_{8,2}^2$ | $h_{8,3} = h_{8,3}^2$ | $h_{8,4} = h_{8,4}^2$ |
| 10 | $h_{10,1} = h_{9,1} - x_{1,1}$ | $h_{10,2} = h_{9,2} - x_{1,2}$ | $h_{10,3} = h_{9,3} - x_{1,3}$ | $h_{10,4} = h_{9,4} - x_{1,4}$ |
| 11 | $x_{3,1} = h_{10,1} - x_{2,1} = \left(\dfrac{y_{2,1} - y_{1,1}}{x_{2,1} - x_{1,1}}\right)^2 - x_{1,1} - x_{2,1}$ | $x_{3,2} = h_{10,2} - x_{2,2}$ | $x_{3,3} = h_{10,3} - x_{2,3}$ | $x_{3,4} = h_{10,4} - x_{2,4}$ |
| 12 | $h_{12,1} = x_{1,1} - x_{3,1}$ | $h_{12,2} = x_{1,2} - x_{3,2}$ | $h_{12,3} = x_{1,3} - x_{3,3}$ | $h_{12,4} = x_{1,4} - x_{3,4}$ |
| 13 | $h_{13,1} = h_{12,1} h_{8,1}$ | $h_{13,2} = h_{12,2} h_{8,2}$ | $h_{13,3} = h_{12,3} h_{8,3}$ | $h_{13,4} = h_{12,4} h_{8,4}$ |
| 14 | $y_{3,1} = h_{13,1} - y_{1,1} = \left(\dfrac{y_{2,1} - y_{1,1}}{x_{2,1} - x_{1,1}}\right)(x_{1,1} - x_{3,1}) - y_{1,1}$ | $y_{3,2} = h_{13,2} - y_{1,2}$ | $y_{3,3} = h_{13,3} - y_{1,3}$ | $y_{3,4} = h_{13,4} - y_{1,4}$ |

Figure 2

| Step | Point Addition | Point Doubling |
|---|---|---|
| 1 | $h_{1,1}=x_{2,1}-x_{1,1}$ | $h_{1,2}=2y_{1,2}$ |
| 2 | $h_2=h_{1,1}h_{1,2}$ | |
| 3 | $h_3=\dfrac{1}{h_2}$ | |
| 4 | $h_{4,1}=h_{1,2}h_3$ | $h_{4,2}=h_{1,1}h_3$ |
| 5 | $h_{5,1}=y_{2,1}-y_{1,1}$ | $h_{5,2}=x_{1,2}^2$ |
| 6 | $h_{6,1}=h_{4,1}h_{5,1}$ | $h_{6,2}=h_{5,2}+h_{5,2}$ |
| 7 | $h_{7,1}=h_{6,1}^2$ | $h_{7,2}=h_{5,2}+h_{6,2}$ |
| 8 | $h_{8,1}=h_{7,1}-x_{1,1}$ | $h_{8,2}=h_{7,2}+a_2$ |
| 9 | $x_{3,1}=h_{8,1}-x_{2,1}=\left(\dfrac{y_{2,1}-y_{1,1}}{x_{2,1}-x_{1,1}}\right)^2-x_{1,1}-x_{2,1}$ | $h_{9,2}=h_{4,2}h_{8,2}$ |
| 10 | $h_{10,1}=x_{1,1}-x_{3,1}$ | $h_{10,2}=h_{9,2}^2$ |
| 11 | $h_{11,1}=h_{10,1}h_{6,1}$ | $h_{11,2}=h_{10,2}-x_{1,2}$ |
| 12 | $y_{3,1}=h_{11,1}-y_{1,1}=\left(\dfrac{y_{2,1}-y_{1,1}}{x_{2,1}-x_{1,1}}\right)(x_{1,1}-x_{3,1})-y_{1,1}$ | $x_{3,2}=h_{11,2}-x_{1,2}=\left(\dfrac{3x_{1,2}^2+a_2}{2y_{1,2}}\right)^2-2x_{1,2}$ |
| 13 | | $h_{13,2}=x_{1,2}-x_{3,2}$ |
| 14 | | $h_{14,2}=h_{13,2}h_{9,2}$ |
| 15 | | $y_{3,2}=h_{14,2}-y_{1,2}=\left(\dfrac{3x_{1,2}^2+a_2}{2y_{1,2}}\right)(x_{1,2}-x_{3,2})-y_{1,2}$ |

Figure 3

| M: multiplication S: squaring I: inversion | Mixed coordinates (as in [Cohen]) | Affine | Affine, n operations sharing 1 inversion |
|---|---|---|---|
| Point Addition | $9M+5S$ (Jacobian modified + affine) | $2M+1S+1I$ | $(5-\frac{3}{n})M+1S+\frac{1}{n}I$ |
| Point Doubling | $4M+4S$ (2 * Jacobian modified) | $2M+2S+I$ | $(5-\frac{3}{n})M+2S+\frac{1}{n}I$ |

Figure 4

| M: multiplication S: squaring I: inversion | Projective (as in [Lopez]) | Affine (as in [Lopez]) | Affine, n operations sharing 1 inversion (using [Lopez]) |
|---|---|---|---|
| Point Addition | $4M+1S$ | $1M+1S+1I$ | $(4-\frac{3}{n})M+1S+\frac{1}{n}I$ |
| Point Doubling | $2M+4S$ | $1M+1S+1I$ | $(4-\frac{3}{n})M+1S+\frac{1}{n}I$ |

Figure 5

| M: multiplication S: squaring I: inversion | Projective (as in [Hankerson]) | Affine (as in [Hankerson]) | Affine, n operations sharing 1 inversion (using [Hankerson] |
|---|---|---|---|
| Point Addition | $9M+4S$ | $2M+1S+1I$ | $(5-\frac{3}{n})M+1S+\frac{1}{n}I$ |

| Step | Point Addition 1 | Point Addition 2 | Point Addition 3 | Point Addition 4 |
|---|---|---|---|---|
| 1 | $h_{1,1}=x_{2,1}-x_{1,1}$ | $h_{1,2}=x_{2,2}-x_{1,2}$ | $h_{1,3}=x_{2,3}-x_{1,3}$ | $h_{1,4}=x_{2,4}-x_{1,4}$ |
| 2 | $h_{2,1}=h_{1,1}h_{1,2}$ | | | $h_{2,2}=h_{1,3}h_{1,4}$ |
| 3 | | $h_3=h_{2,1}h_{2,2}$ | | |
| 4 | | $h_4=\dfrac{1}{h_3}$ | | |
| 5 | $h_{5,1}=h_4 h_{2,2}$ | | | $h_{5,2}=h_4 h_{2,1}$ |
| 6 | $h_{6,1}=h_{5,1}h_{1,2}=\dfrac{1}{h_{1,1}}$ | $h_{6,2}=h_{5,1}h_{1,1}=\dfrac{1}{h_{1,2}}$ | $h_{6,3}=h_{5,2}h_{1,4}=\dfrac{1}{h_{1,3}}$ | $h_{6,3}=h_{5,2}h_{1,3}=\dfrac{1}{h_{1,4}}$ |
| 7 | $h_{7,1}=y_{2,1}-y_{1,1}$ | $h_{7,2}=y_{2,2}-y_{1,2}$ | $h_{7,3}=y_{2,3}-y_{1,3}$ | $h_{7,4}=y_{2,4}-y_{1,4}$ |
| 8 | $h_{8,1}=h_{6,1}h_{7,1}$ | $h_{8,2}=h_{6,2}h_{7,2}$ | $h_{8,3}=h_{6,3}h_{7,3}$ | $h_{8,4}=h_{6,4}h_{7,4}$ |
| 9 | $h_{9,1}=h_{8,1}^2$ | $h_{8,2}=h_{8,2}^2$ | $h_{8,3}=h_{8,3}^2$ | $h_{8,4}=h_{8,4}^2$ |
| 10 | $h_{10,1}=h_{9,1}-x_{1,1}$ | $h_{10,2}=h_{9,2}-x_{1,2}$ | $h_{10,3}=h_{9,3}-x_{1,3}$ | $h_{10,4}=h_{9,4}-x_{1,4}$ |
| 11 | $x_{3,1}=h_{10,1}-x_{2,1}$ | $x_{3,2}=h_{10,2}-x_{2,2}$ | $x_{3,3}=h_{10,3}-x_{2,3}$ | $x_{3,4}=h_{10,4}-x_{2,4}$ |
| 12 | $h_{12,1}=x_{1,1}-x_{3,1}$ | $h_{12,2}=x_{1,2}-x_{3,2}$ | $h_{12,3}=x_{1,3}-x_{3,3}$ | $h_{12,4}=x_{1,4}-x_{3,4}$ |
| 13 | $h_{13,1}=h_{12,1}h_{8,1}$ | $h_{13,2}=h_{12,2}h_{8,2}$ | $h_{13,3}=h_{12,3}h_{8,3}$ | $h_{13,4}=h_{12,4}h_{8,4}$ |
| 14 | $y_{3,1}=h_{13,1}-y_{1,1}$ | $y_{3,2}=h_{13,2}-y_{1,2}$ | $y_{3,3}=h_{13,3}-y_{1,3}$ | $y_{3,4}=h_{13,4}-y_{1,4}$ |

| Step | Point Addition 1 | Point Addition 2 | Point Addition 3 | Point Addition 4 |
|---|---|---|---|---|
| 1 | $h_{1,1}=x_{2,1}-x_{1,1}$ | $h_{1,2}=x_{2,2}-x_{1,2}$ | $h_{1,3}=x_{2,3}-x_{1,3}$ | $h_{1,4}=x_{2,4}-x_{1,4}$ |
| 2 | | $h_{2,1}=h_{1,1}h_{1,2}$ | | $h_{2,2}=h_{1,3}h_{1,4}$ |
| 3 | | | $h_3=h_{2,1}h_{2,2}$ | |
| 4 | | | $h_4=\dfrac{1}{h_3}$ | |
| 5 | $h_{5,1}=h_4 h_{2,2}$ | | $h_{5,2}=h_4 h_{2,1}$ | |
| 6 | $h_{6,1}=h_{5,1}h_{1,2}=\dfrac{1}{h_{1,1}}$ | $h_{6,2}=h_{5,1}h_{1,1}=\dfrac{1}{h_{1,2}}$ | $h_{6,3}=h_{5,2}h_{1,4}=\dfrac{1}{h_{1,3}}$ | $h_{6,3}=h_{5,2}h_{1,3}=\dfrac{1}{h_{1,4}}$ |
| 7 | $h_{7,1}=y_{2,1}-y_{1,1}$ | $h_{7,2}=y_{2,2}-y_{1,2}$ | $h_{7,3}=y_{2,3}-y_{1,2}$ | $h_{7,4}=y_{2,4}-y_{1,2}$ |
| 8 | $h_{8,1}=h_{6,1}h_{7,1}$ | $h_{8,2}=h_{6,2}h_{7,2}$ | $h_{8,3}=h_{6,3}h_{7,3}$ | $h_{8,4}=h_{6,4}h_{7,4}$ |
| 9 | $h_{9,1}=h_{8,1}^2$ | $h_{8,2}=h_{8,2}^2$ | $h_{8,3}=h_{8,3}^2$ | $h_{8,4}=h_{8,4}^2$ |
| 10 | $h_{10,1}=h_{9,1}-x_{1,1}$ | $h_{10,2}=h_{9,2}-x_{1,2}$ | $h_{10,3}=h_{9,3}-x_{1,3}$ | $h_{10,4}=h_{9,4}-x_{1,4}$ |
| 11 | $x_{3,1}=h_{10,1}-x_{2,1}$ | $x_{3,2}=h_{10,2}-x_{2,2}$ | $x_{3,3}=h_{10,3}-x_{2,3}$ | $x_{3,4}=h_{10,4}-x_{2,4}$ |
| 12 | $h_{12,1}=x_{1,1}-x_{3,1}$ | $h_{12,2}=x_{1,2}-x_{3,2}$ | $h_{12,3}=x_{1,3}-x_{3,3}$ | $h_{12,4}=x_{1,4}-x_{3,4}$ |
| 13 | $h_{13,1}=h_{12,1}h_{8,1}$ | $h_{13,2}=h_{12,2}h_{8,2}$ | $h_{13,3}=h_{12,3}h_{8,3}$ | $h_{13,4}=h_{12,4}h_{8,4}$ |
| 14 | $y_{3,1}=h_{13,1}-y_{1,1}$ | $y_{3,2}=h_{13,2}-y_{1,2}$ | $y_{3,3}=h_{13,3}-y_{1,3}$ | $y_{3,4}=h_{13,4}-y_{1,4}$ |

ACCELERATING ELLIPTIC CURVE POINT MULTIPLICATION THROUGH BATCHED INVERSIONS

BACKGROUND

1. Field of the Invention

This application relates to efficient computation in computer systems and more particularly to efficient computation associated with elliptic curve cryptography (ECC).

2. Description of the Related Art

Elliptic curve cryptography (ECC) has evolved into a mature public-key cryptosystem through extensive research on its underlying math, its security strength, and efficient implementations. ECC offers the smallest key size and the highest strength per bit of any known public-key cryptosystem. In addition, it allows for efficient computation in software as well as hardware implementations. This makes ECC a good choice for application in Internet security protocols such as SSL or IPsec. Furthermore, the computational efficiency of ECC can enable small devices ranging from cell phones, PDAs, smart cards down to embedded devices to execute strong public-key cryptography.

As an emerging alternative to the RSA algorithm, the United States government has adopted ECC for the Elliptic Curve Digital Signature Algorithm (ECDSA) and specified elliptic curves for government and commercial use. Further standards have been defined by the standards bodies IEEE, ANSI, OMG, IETF and SECG.

Large numbers of secure connections/transactions initiated by a multitude of client devices impose a significant burden on servers executing security protocols. In particular, public-key cryptography (such as RSA or ECC operations) contributes to a large fraction of the computational load. Hence, improving public-key operations is an important goal to alleviate server load and therefore increase connection/transaction throughput.

SUMMARY

Executing multiple ECC operations in parallel and using batched inversions allows shared computations between independent ECC operations. Thus the total cost of each individual ECC operation can be lowered. Inversion batching for ECC can be applied to both software and hardware implementations.

In one embodiment a method is provided that includes sharing-a batched inversion among multiple independent elliptic curve cryptography (ECC) point multiplications. The method may further include a single thread computing the multiple independent elliptic curve cryptography (ECC) point multiplications and using the batched inversion. In another embodiment, at least two threads processing multiple point multiplications may synchronize to share the batched inversion and otherwise process the multiple point multiplications independently. The method may include computing the point multiplications using projective coordinates or using affine coordinates. The method may further include computing the point multiplications over a prime integer field or over a binary polynomial field. The batched inversion may be shared between at least one point addition and at least one point doubling, between point additions, or between point doublings.

In another embodiment a computer program product encoded in at least one computer readable medium includes code executable to process a plurality of independent elliptic curve cryptography (ECC) point multiplications and to use a batched inversion for the multiple independent elliptic curve cryptography (ECC) point multiplications. As used herein, a computer readable medium includes at least disk, tape, or other magnetic, optical, semiconductor (e.g., flash memory cards, ROM), or electronic medium and a network, wireline, wireless or other communications medium.

Another embodiment provides a computer system configured to process a plurality of secure transactions and to combine inversions from multiple independent elliptic curve cryptography (ECC) point multiplications belonging to respective secure transactions into one inversion and multiple multiplications.

In another embodiment a computer system includes at least one inversion circuit, the computer system configured to process a batched inversion in the inversion circuit for independent elliptic curve cryptography (ECC) point multiplications.

BRIEF DESCRIPTION OF THE DRAWINGS

The present invention may be better understood, and its numerous objects, features, and advantages made apparent to those skilled in the art by referencing the accompanying drawings.

FIG. 2 shows four ECC point additions in affine coordinates sharing an inversion.

The use of the same reference symbols in different drawings indicates similar or identical items.

DESCRIPTION OF THE PREFERRED EMBODIMENT(S)

The fundamental and most expensive operation of elliptic curve cryptography (ECC) is point multiplication. Point multiplication is performed on a large integer k and a point P on an elliptic curve. It calculates a point multiple kP using repeated point additions and point doublings. Point addition adds two points $S_1$ and $S_2$ computing $R=S_1+S_2$. Similarly, point doubling doubles a point S computing $R=2S$. Given, for example, $k=9$, the point multiplication $Q=kP$ can be computed through the following sequence of point additions and point doublings: $Q=(2(2(2P)))+P=9P$.

Figure 1:
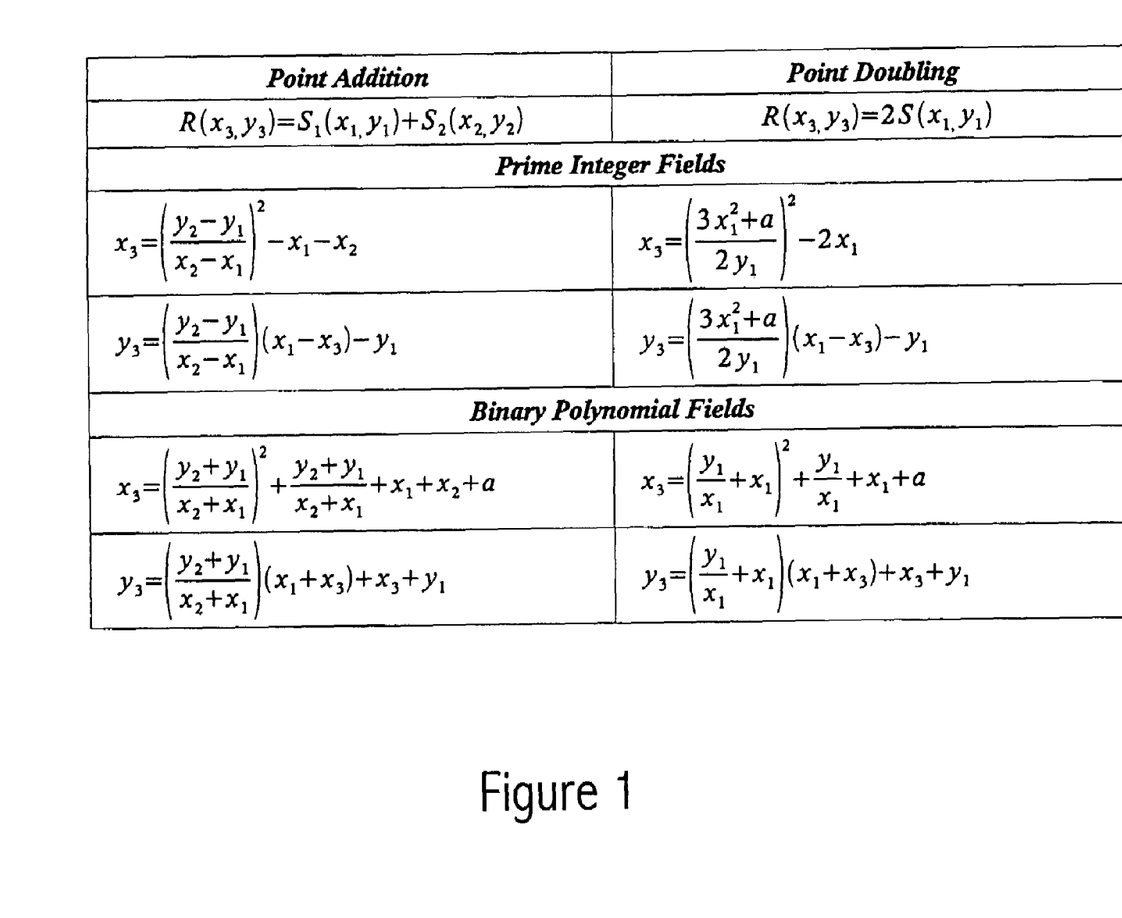
FIG. 1 shows formulas for point addition and point doubling in prime integer and binary polynomial fields.

ECC can operate in two modes using elliptic curves defined over either prime integer fields or binary polynomial fields. The formulas for point addition and point doubling depend on which type of field is used. Formulas for point addition and point doubling in affine coordinates are shown in FIG. 1.

Most noticeably, both point addition and point doubling in both modes involve inversions/divisions, which are costly in terms of computation time in software and in terms of computation time and/or chip area in hardware. Therefore most implementations of ECC point multiplication choose to employ projective coordinate systems instead of implementing the above formulas in affine coordinates. Projective coordinate systems replace inversions with a number of less expensive multiplications. Different projective coordinate systems are known in the art including standard projective, Jacobian, Chudnovsky and Lopez-Dahab coordinates.

One embodiment of the invention uses affine rather than projective coordinates for ECC point multiplication and shares the high cost of inversions among multiple independent point multiplications by batching inversions. As used herein, independent point multiplications are point multiplications that belong to different secure transactions such as key agreement, data encryption and decryption as well as digital signature generation and verification. Examples of secure transactions that require elliptic curve point multiplications are applications of the Elliptic Curve Diffie-Hellman key agreement algorithm (ECDH), the Elliptic Curve Menezes Qu Vanstone key agreement algorithm (ECMQV), the Elliptic Curve Integrated Encryption Scheme (ECIES) or the Elliptic Curve Digital Signature Algorithm (ECDSA).

Multiple independent point multiplications have to be processed, for example, on a web server that accepts secure connections from different clients. Batching inversions combines multiple inversions into one calculation using only one inversion and multiple multiplications. For example, two inverses $$i_1 = \frac{1}{x_1} \text{ and } i_2 = \frac{1}{x_2}$$

can be computed with three multiplications and only one inversion by computing $$h_1 = x_1 x_2, \, h_2 = \frac{1}{h_1} = \frac{1}{x_1 x_2}, \, i_1 = h_2 x_2 = \frac{1}{x_1}, \text{ and } i_2 = h_2 x_1 = \frac{1}{x_2}.$$

This scheme can be extended to an arbitrary number of inverses, whereby 3n—3 multiplications and 1 inversion are needed to calculate n inverses.

Figure 3:
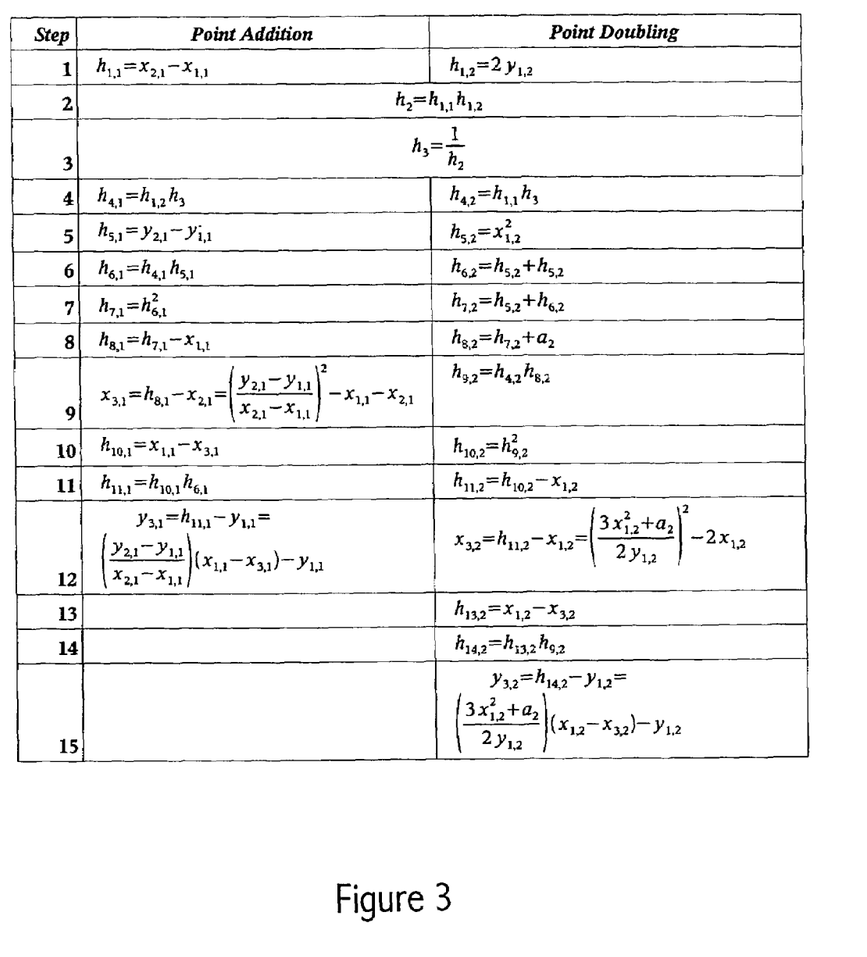
FIG. 3 shows stepwise computation of one point addition and one point doubling over a prime integer field sharing one inversion.

Elliptic curve point multiplications include a sequence of point additions and point doublings. FIG. 2 shows four ECC point additions in affine coordinates sharing an inversion. More particularly, illustrated is stepwise computation of four independent point additions over a prime integer field sharing one inversion. The four point additions are assumed to be independent, which is the case if they are part of four independent point multiplications. Steps 2, 3, 4 and 5 are shared between the point additions, whereas the other steps are executed for each individual point addition. Given n=4 point additions, the n inversions can be computed with 3n−3 multiplications and 1 inversion. Hence, the amortized cost for an inversion for each individual point addition is $$3 - \frac{3}{n}$$

multiplications and $$\frac{1}{n}$$

inversions. Inversions can also be shared between multiple point additions and point doublings. FIG. 3 shows stepwise computation of one point addition and one point doubling over a prime integer field sharing one inversion.

Although FIGS. 2 and 3 show formulas for prime integer fields, the same technique of sharing inversions can be applied to binary polynomial fields. Also note that steps correspond to the execution of single arithmetic operations and do not indicate that these operations have to be executed in this order, executed concurrently or take the same amount of time.

Figure 4:
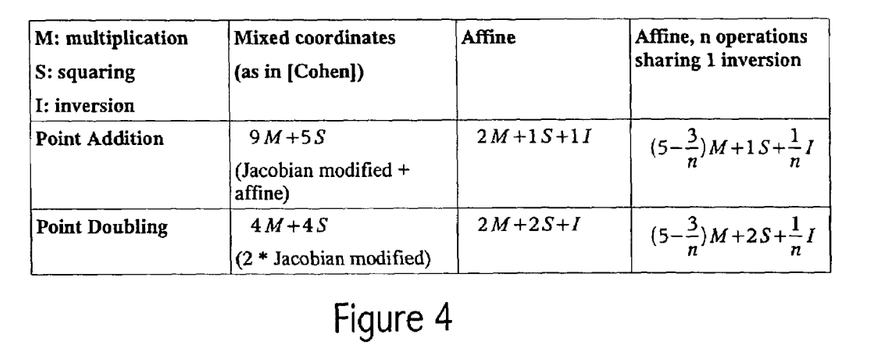
FIG. 4 shows point doubling costs over prime integer fields in different coordinate systems.

The cost of point additions and point doublings depends on the chosen coordinate systems and is commonly approximated by the number of multiplications, squarings and inversions since these are the most expensive operations. The cost further depends on the ECC mode, that is whether binary polynomial or prime integer fields are used. A survey of the costs of point additions and point doublings over prime integer fields in different coordinate systems can be found, e.g., in H. Cohen, A. Miyaji, and T. Ono, *Efficient elliptic curve exponentiation using mixed coordinates*, in K. Ohta and D. Pei, editors, Advances in Cryptology|ASIACRYPT 98, pages 51-65. Springer Verlag, 1998. LNCS 1514. FIG. 4 compares the approach of using batched inversions with an implementation in modified Jacobian projective coordinates. To compare the complexity of the two approaches, the relative cost of squarings and inversions to multiplications needs to be known. In typical hardware and software implementations, squarings are between 0.5, and 1.0 times as expensive as multiplications, whereas inversions are approximately 10 to 100 times as expensive as multiplications. For large numbers n of operations sharing one inversion, the approach using a shared inversion described herein is slightly faster for point doublings as shown in FIG. 4, since $$n \xrightarrow{\lim} \infty \left(5 - \frac{3}{n}\right)M + 2S + \frac{1}{n}I = 5M + 2S \leq 4M + 4S$$

(where M indicates multiplications, S indicates squaring and I indicates inversion) and significantly faster for point additions since $$n \xrightarrow{\lim} \infty \left(5 - \frac{3}{n}\right)M + 1S + \frac{1}{n}I = 5M + 1S < 9M + 5S$$

as shown in FIG. 4.

Figure 5:
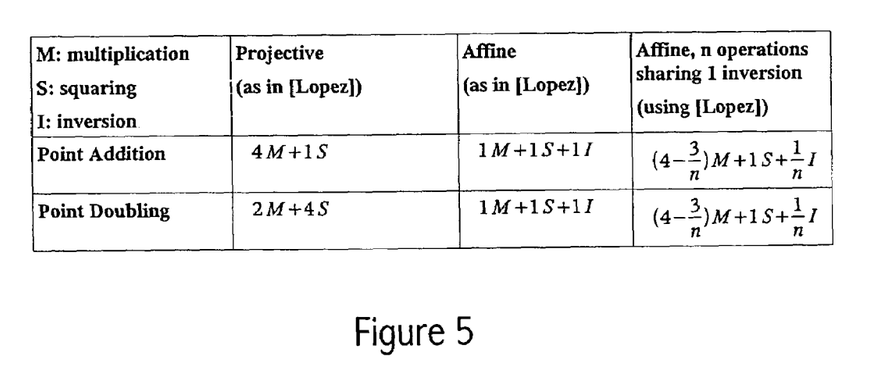
FIG. 5 shows point addition and point doubling costs using Montgomery Scalar Point Multiplication over binary polynomial fields.

FIG. 5 compares the application of batched inversions to ECC over binary polynomial fields with an implementation for arbitrary elliptic curves described, e.g. in J. Lopez, R. Dahab. *Fast multiplication on elliptic curves over GF($2^m$)*

Figure 6:
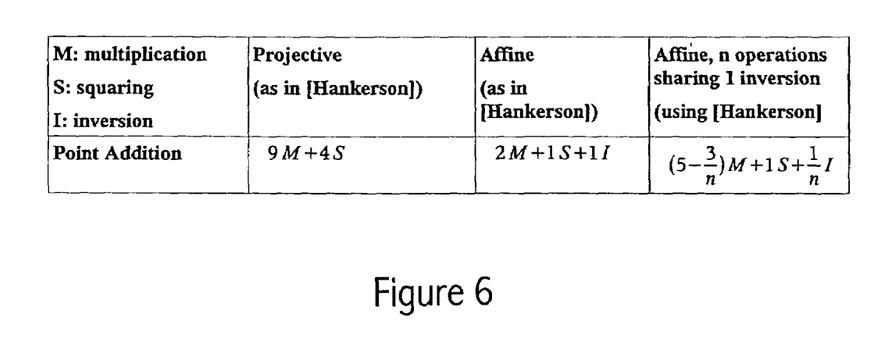
FIG. 6 shows point addition costs using optimized algorithms for Koblitz curves.

*without precomputation*, CHES '99 Workshop on Cryptographic Hardware and Embedded Systems, Springer Verlag, Lecture Notes in Computer Science 1717, August 1999. A minimal computational advantage can be achieved in theory for large numbers of operations. However, it is insignificant for practical applications. For a special type of elliptic curves over binary polynomial fields called Koblitz curves, there are more efficient algorithms described, for example, in D. Hankerson, J. L. Hernandez and A. J. Menezes. *Software implementation of elliptic curve cryptography over binary fields*, Cryptographic Hardware and Embedded Systems—CHES 2000, Springer LNCS 1965, 1—24, 2000. The computation time of these algorithms is dominated by point additions whereas the cost of point doublings is negligible. Given the costs of point additions in affine and projective coordinate as shown in FIG. 6, using batched inversions provides a performance advantage since $$\lim_{n \to \infty} \left(5 - \frac{3}{n}\right)M + 1S + \frac{1}{n}I = 5M + 1S < 9M + 4S.$$

That is, 5M+1S are needed for large numbers of point additions using batched inversions where 9M+4S are needed using the implementation described in Hankerson.

For some applications, the algorithms in Hankerson can also be applied to reduce the number of point doublings for ECC over prime integer fields. One such application is the generation of digital signatures with the Elliptic Curve Digital Signature Algorithm (ECDSA). Note that the efficiency of using batched inversions increases as the ratio of point additions to point doublings increases.

Even when a point multiplication is computed in projective coordinates, one inversion is needed at the end of the computation independent of whether prime integer or binary polynomial fields are used. The technique of batching inversions can also be applied to only share this last inversion among multiple independent point multiplications.

All arithmetic operations in prime integer fields GF(p) and binary polynomial fields $GF(2^m)$ use modular arithmetic, that is they are performed modulo a prime p for prime integer fields or an irreducible polynomial M for binary polynomial fields. For example, assuming the prime field GF(7) with p=7, the addition of 5 and 6 would result in (5+6) mod 7=11 mod 7=4, and the multiplication of 5 and 6 would result in (5×6) mod 7=30 mod 7=2. Batching inversions among multiple point multiplications requires that they are all performed in the same field. That is, they all need to share the same modulus p or M, respectively. For practical applications this is a minor limitation since point multiplications on heavily loaded servers are likely to be performed on either the same or a small set of elliptic curves. Point multiplications on the same elliptic curve are performed in the same field.

Batched inversions can be applied to all applications that require computing large numbers of elliptic curve public-key operations or, more specifically, ECC point multiplications. This includes secure web servers, authentication servers, transactional systems that perform digital signature generation and verification, ECC hardware accelerators, etc.

Figure 7:
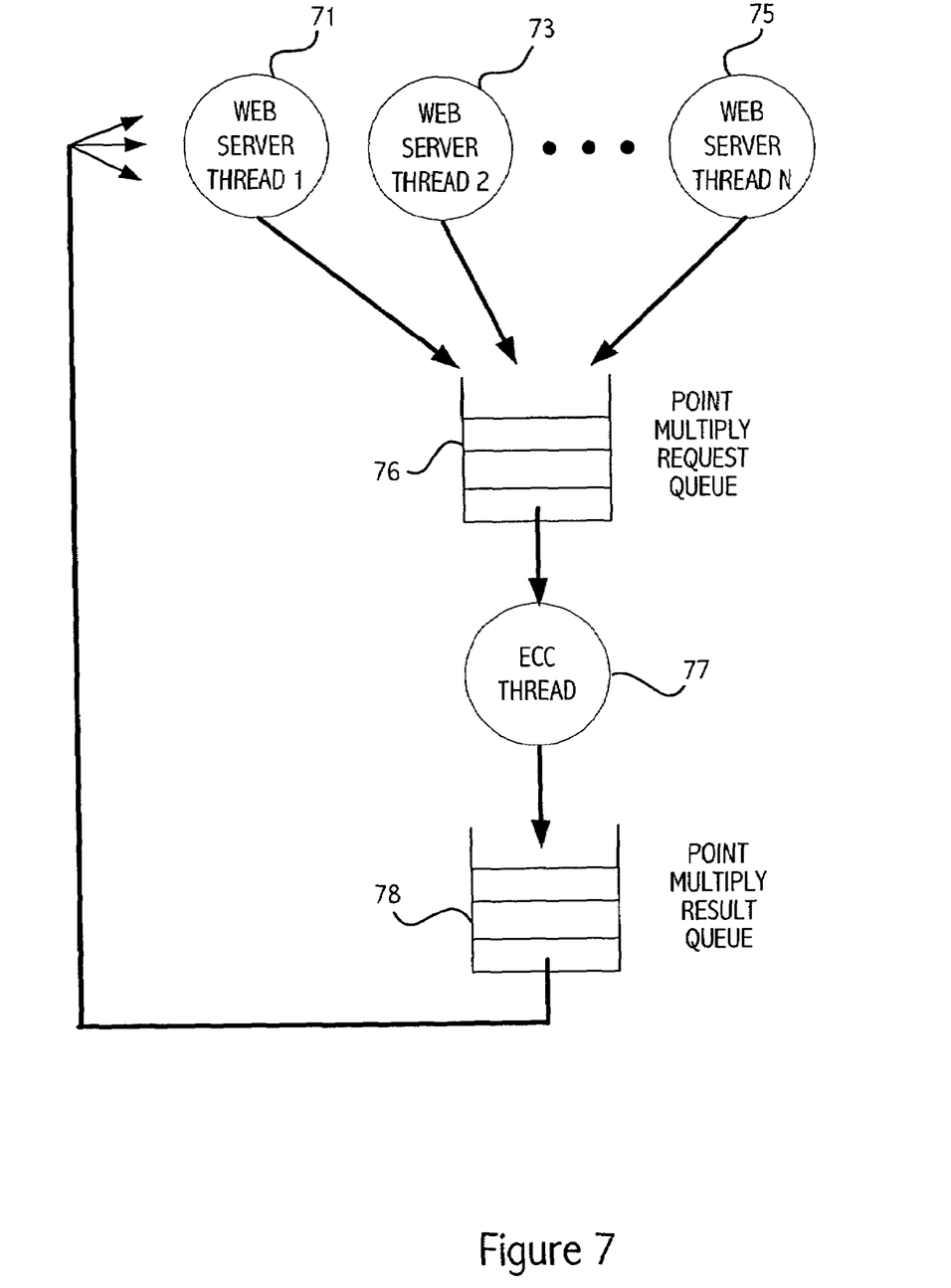
FIG. 7 illustrates an approach to accelerate ECC operations with batched inversions according to an embodiment of the invention.

Modern web servers allow web clients to view web pages and submit data through secure HTTPS (HTTP over SSL) connections. To establish an HTTPS connection using ECC, one or more ECC point multiplications are required on the web server side. Under high load, the web server needs to process large numbers of HTTPS connections per second. To support these large numbers of client requests and to scale to multi-CPU systems, web server software commonly processes secure transactions in multiple processes or multiple threads of computation. One approach to accelerate ECC operations with batched inversions is shown in FIG. 7. Web server threads 71, 73, 75 that accept secure connections submit ECC point multiplication requests to a queue 76, which is then processed in batches by a single thread 77 employing batched inversions. The results are returned to the respective threads. Before returning the results, they may be stored temporarily in a result queue 78. While a secure web server application is described as an example, the techniques described herein can be applied to other systems that process secure connections or transactions.

Figure 8:
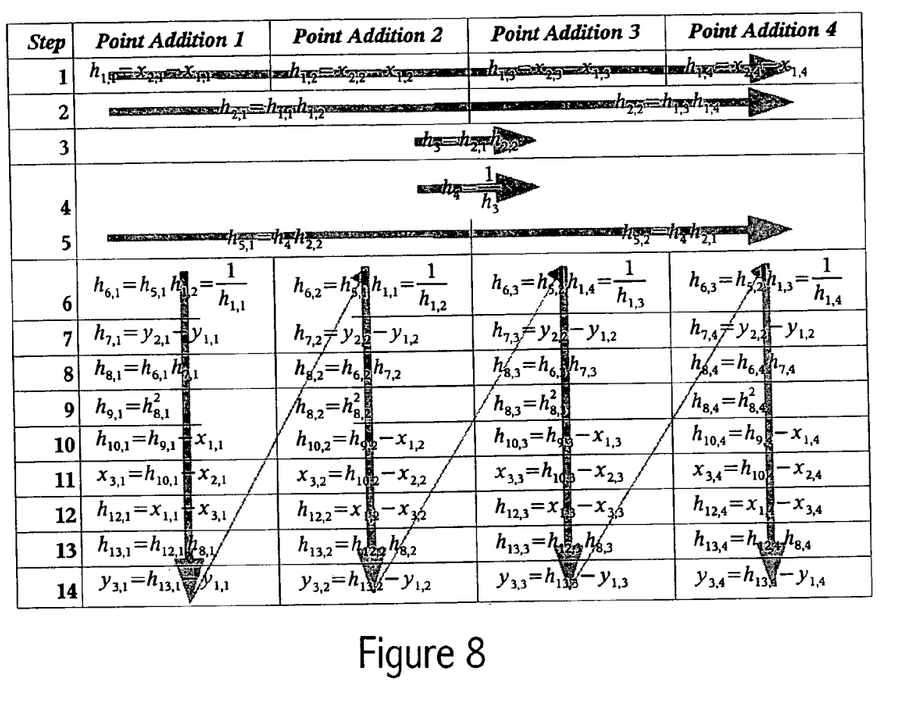
FIG. 8 shows a single thread processing four elliptic curve point additions as part of four independent point multiplications.

FIG. 8 shows a single thread processing four elliptic curve point additions as part of four independent point multiplications. As indicated by the arrows, all arithmetic operations are performed sequentially. As shown in FIG. 8 the arithmetic operations are performed for each point addition 1-4 in steps 1 through 5. In step 6, the sequential operations (steps 6-14) are performed for point addition 1 until it is completed and then the thread continues with the next point addition and so on. Alternatively, in another approach (not shown in FIG. 8), the sequential operations (steps 6-14) may be performed such that step 6 is performed for all point additions before moving to step 7 and so on. Note that the order of steps 6-14 can be further modified according to the dependencies of the arithmetic operations. Moreover, other schemes for ordering the operations between point additions can be employed as would be apparent to those of skill in the art.

Figure 9:
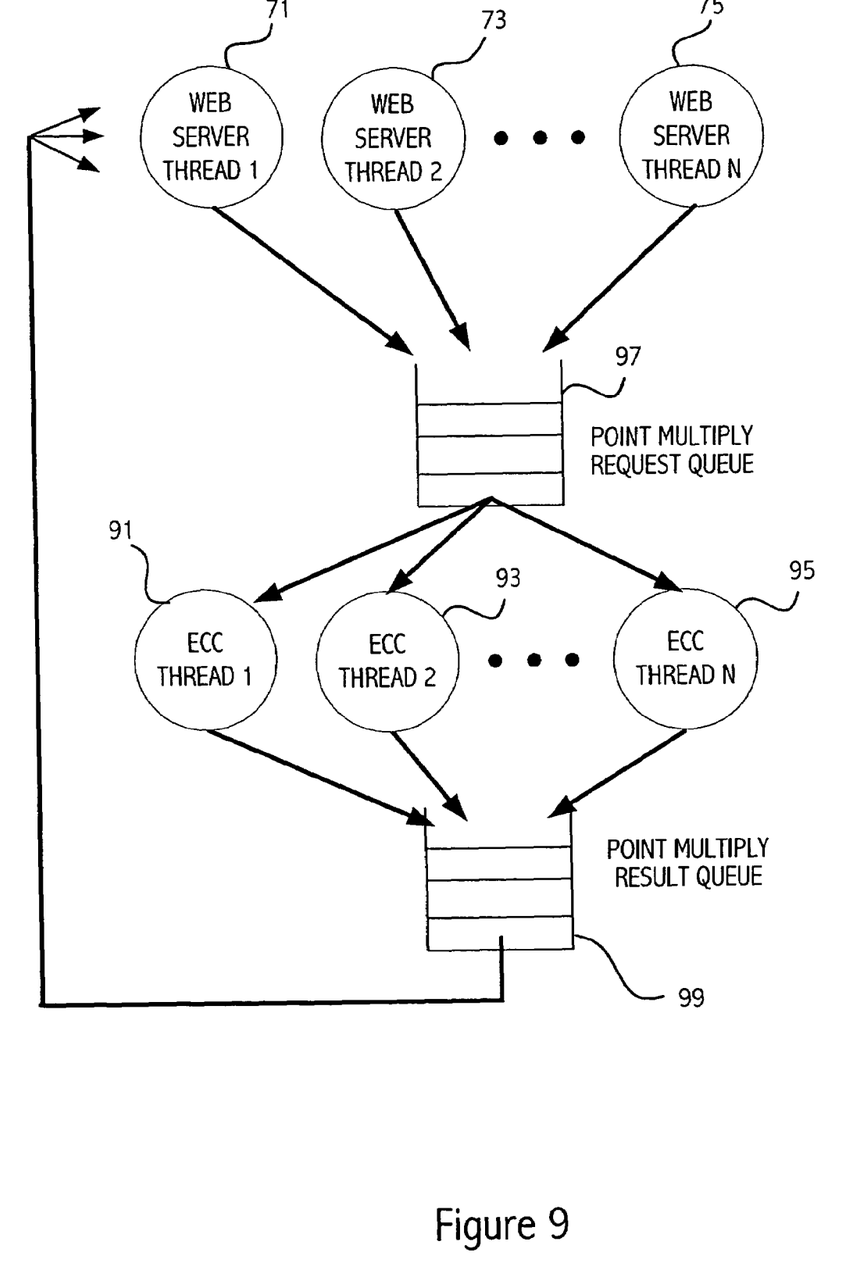
FIG. 9 shows multiple ECC point multiplication threads processing point multiplications from a single point multiplication queue.
Figure 10:
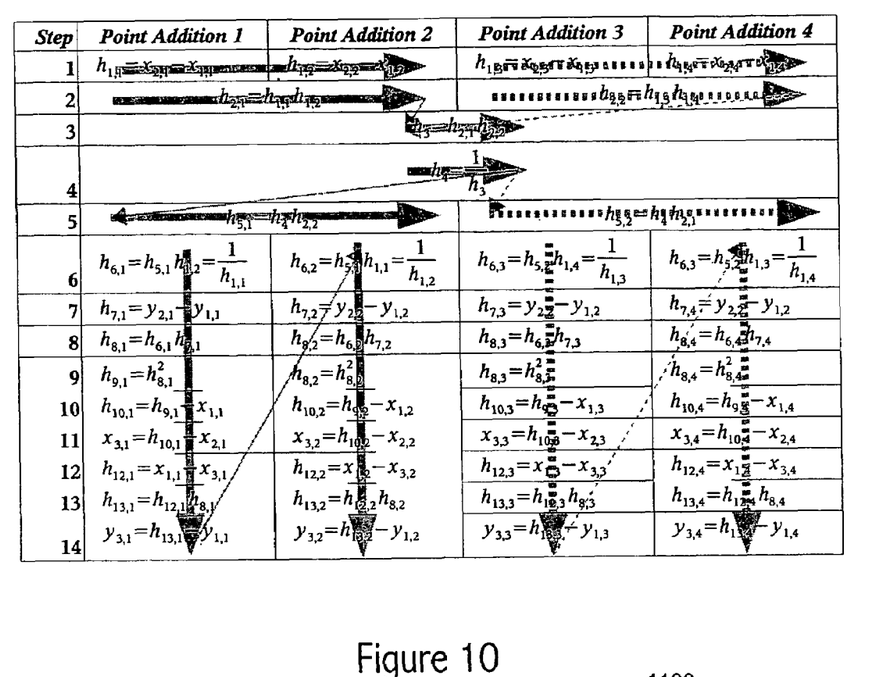
FIG. 10 illustrates computation of four independent point additions sharing one inversion with two threads.

Similar to having multiple web server threads, multiple threads can be also used to scale ECC point multiplication performance. FIG. 9 shows multiple ECC point multiplication threads 91, 93, and 95 processing point multiplications from a single point multiplication queue 97 and supplying results to a single result queue 99. The results are supplied back to the web server threads. Using batched inversions, there are different ways of dividing the computation between threads. In one case, each thread is assigned multiple point multiplications and processes them sequentially and independently from other threads as shown in FIG. 7. In this case no inversions are shared between threads. In another case, each thread is assigned one or more point multiplications, whereby the threads process the point multiplications independently, but synchronize for the shared inversion. FIG. 10 shows an example of two threads processing two point additions each. Thus, four independent point additions are being computed by the two threads, which share one inversion. The threads synchronize for the inversion in steps 3 and 4, but proceed independently before and afterwards.

In order to increase point multiplication efficiency, it is desirable to process as many point multiplications in parallel as possible. This requires waiting for point multiplication requests to accumulate in the queue before processing them in batches. While longer wait times and thus larger numbers of point multiplications increase efficiency, they add latency to each connection/transaction request. Scheduling algorithms can be employed to balance connection latency and throughput. As a general rule, longer wait times can be used to increase efficiency under high loads whereas shorter wait times can be used to minimize latency under low loads.

Cryptographic hardware accelerators are generally used in environments that need to sustain large numbers of secure connections/transactions. Therefore, increasing throughput is a primary goal of using hardware accelerators. In the case of ECC point multiplication, increased accelerator throughput can be achieved by batching inversions.

Figure 11:
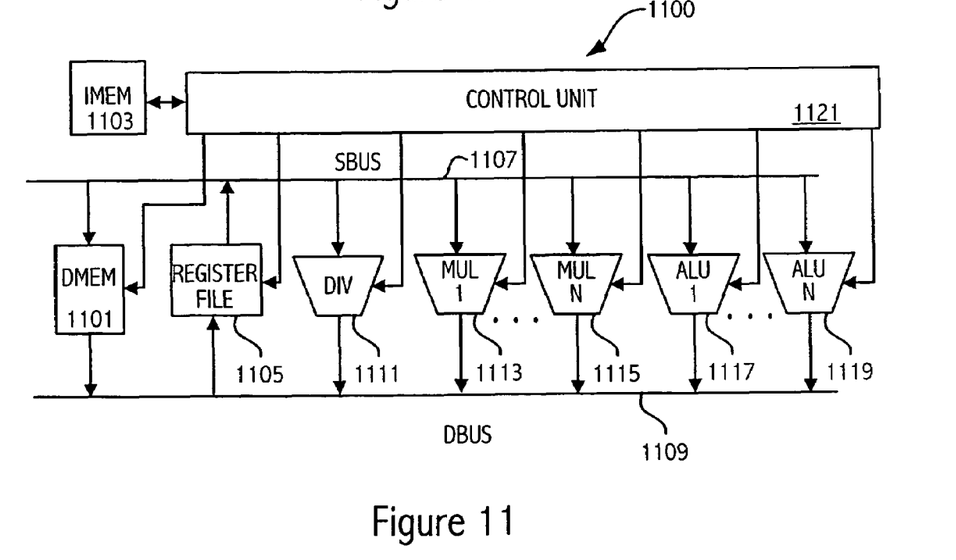
FIG. 11 shows an example of an elliptic curve hardware accelerator that can exploit batched inversions.

FIG. 11 shows an example of an elliptic curve hardware accelerator 1100 that can exploit batched inversions. The exemplary accelerator 1100 includes a data memory DMEM 1101, an instruction memory IMEM 1103, a register file 1105, two shared data buses SBUS 1107 and DBUS 1109, an arithmetic unit for inversion/division (DIV) 1111, multiplication (MUL) units 1113-1115 and additions/subtractions/shifts (ALU) units 1117 to 1119 and a control unit 1121. Variables and parameters are stored in the data memory DMEM and can be transferred in and out of the register file. Code for ECC point multiplication is stored in the instruction memory IMEM and executed by the control unit. The control unit transfers operands of arithmetic instructions from the register file to the arithmetic units over the SBUS. Results are transferred back into the register file over the DBUS. The embodiment illustrated in FIG. 11 is exemplary and, as would be known to those skilled in the art, the functionality described to achieve batched inversions can be implemented in different ways and different places in a computer system, e.g., as a separate accelerator as shown in FIG. 11, as a co-processor, or even as a functional unit on a processor.

To optimize throughput, multiple independent point multiplications can be executed in parallel. As illustrated, for example, in FIG. 2, only one inversion is required regardless of how many independent point additions and point doublings are executed in parallel. Therefore, the architecture in FIG. 11 shows only one circuit for inversion/division (DIV). The performance of the architecture can be scaled by scaling the number of multipliers (MUL), adders/subtractors/shifters (ALU), registers and memory ports. That is, the cost of adding inversion/division circuitry can be amortized and performance be scaled without adding further inverters/dividers.

In the case of a server application that handles multiple connections/transactions involving Elliptic Curve Diffie-Hellman (ECDH) key exchanges with the same private key k, multiple independent point multiplications $k P_1, k P_2, \ldots, k P_n$ have to be processed. Since the scalar k is the same for all of the aforementioned point multiplications, they can all be computed with the same sequence of point additions and point doublings. That regularity facilitates the sharing of batched inversions as all point multiplications perform the same sequence of arithmetic operations. Therefore, the batching of inversions between multiple independent point multiplications is particularly applicable to ECDH key exchanges using a constant private key k.

Some techniques to compute elliptic curve point multiplications (e.g. as described in Hankerson) involve the precomputation of a table of elliptic curve points. For example, an algorithm may precompute a table of multiples of a base point P, e.g., multiples 2P, 3P, 4P, . . . , 7P. This table can be used to accelerate the computation of one or more point multiplications. The precomputations may be performed, e.g., every time an SSL connection is established. The precomputation includes point additions and point doublings. For example, for a point multiplication A, a method may precompute points $2P_A, 3P_A, 4P_A, \ldots, 7P_A$ and for a point multiplication B it may precompute points $2P_B, 3P_B, 4P_B, \ldots, 7P_B$. In an exemplary implementation, point doublings $Q_A=2P_A$ and $Q_B=2P_B$ may share an inversion. Likewise, point additions $Q_A=2P_A+P_A$ and $Q_B=2P_B+P_B$ may share an inversion. Therefore, the sharing of batched inversion can be applied to point additions and point doublings used in precomputations for independent point multiplications. Such precomputations may be particularly useful in an environment processing SSL transactions typically having a different point and therefore a different table for each SSL transaction.

Thus, method and apparatus have been described for sharing batched inversions for independent point multiplications. The embodiments described above are presented as examples and are subject to other variations in structure and implementation within the capabilities of one reasonably skilled in the art. For example, while the techniques for sharing batched inversions have been described for web servers, the teachings herein can be employed in other applications that need to perform large numbers of independent ECC point multiplications. The details provided above should be interpreted as illustrative and not as limiting. Variations and modifications of the embodiments disclosed herein, may be made based on the description set forth herein, without departing from the scope of the invention as set forth in the following claims.

What is claimed is:

1. A method, comprising:
   computing a batched inversion to produce a batched inversion result for use in elliptic curve cryptography (ECC) point multiplication; and
   sharing the batched inversion result among multiple independent elliptic curve cryptography (ECC) point multiplications belonging to different secure transactions;
   wherein said computing and said sharing are performed by a device configured to support a public-key cryptography application.

2. The method as recited in claim 1, further comprising processing, by at least two threads, multiple point multiplications, the two threads synchronizing to share the batched inversion result and otherwise processing the multiple point multiplications independently.

3. The method as recited in claim 1, further comprising:
   receiving at a request queue ECC point multiplication requests from at least two threads;
   processing the requests in the request queue using a third thread using the batched inversion result; and
   returning results to respective threads.

4. The method as recited in 1, further comprising executing multiple independent point multiplications in parallel.

5. The method as recited in claim 1, further comprising computing the point multiplications using affine coordinates.

6. The method as recited in claim 1, wherein the point multiplications are computed over a binary polynomial field.

7. The method as recited in claim 1, wherein the batched inversion result is shared between at least one point addition and at least one point doubling.

8. The method as recited in claim 1, wherein the batched inversion result is shared between point additions.

9. The method as recited in claim 1, wherein the batched inversion result is shared between point doublings.

10. The method as recited in claim 1, wherein the inversion is shared between precomputations belonging to the multiple independent elliptic curve cryptography (ECC) point multiplications.

11. A computer-implemented method, comprising:
    receiving multiple independent elliptic curve cryptography (ECC) point multiplications;
    combining inversions from the multiple independent ECC point multiplications into one inversion and multiple multiplications; and
    performing the one inversion and the multiple multiplications to produce a respective result for each of the independent ECC point multiplications.

12. A computer readable storage medium storing program instructions computer-executable to implement:
    processing a plurality of independent elliptic curve cryptography (ECC) point multiplications; and
    returning results of said processing;

wherein said processing comprises using a same batched inversion result in each of the plurality of independent ECC point multiplications.

13. The storage medium as recited in claim 12, wherein said processing comprises at least two threads processing multiple point multiplications, the two threads synchronizing to share the batched inversion result and otherwise each thread processing the multiple point multiplications independently.

14. A computer system, comprising;

means to receive multiple independent elliptic curve cryptography (ECC) point multiplications;

means to combine inversions from the independent ECC point multiplications into one inversion and multiple multiplications; and means to perform the one inversion and the multiplications to reduce a respective result for each of the independent ECC point multiplications.

15. A computer system, comprising at least one inversion circuit, wherein the computer system is configured to perform:

computing a batched inversion to produce a batched inversion result for use in elliptic curve cryptography (ECC) point multiplication; and sharing the batched inversion result among multiple independent elliptic curve cryptography (ECC) point multiplications belong to different secure transactions: and wherein the computer system is configured to support a public-key cryptography application.

16. The computer system as recited in 15, further comprising a cryptographic hardware accelerator configured to perform the batched inversion.

17. The computer system as recited in claim 15, wherein the cryptographic hardware accelerator includes a single inversion circuit for multiple multiplier circuits and multiple adder circuits, the single inversion circuit performing batched inversions for point multiplications being performed in the multiplier and adder circuits.

18. The computer system as recited in claim 15, wherein at least two threads process the multiple independent ECC point multiplications, and wherein the two threads share inversions.

19. The computer system as recited in claim 15, further comprising:

a request queue receiving ECC point multiplication requests from at least two threads; and a third thread processing the requests using batched inversions and returning the results to respective threads.

20. The computer system as recited in claim 15, wherein the inversion is shared between precomputations belonging to the multiple independent elliptic curve cryptography (ECC) point multiplications.

21. An apparatus, comprising:

means for processing a plurality of independent elliptic curve cryptography (ECC) point multiplication, wherein said processing comprises using a same batched inversion result in each of the plurality of independent ECC point multiplications; and means for returning results of said processing.

* * * * *

UNITED STATES PATENT AND TRADEMARK OFFICE
CERTIFICATE OF CORRECTION

| | |
|---|---|
| PATENT NO. | : 7,702,105 B1 |
| APPLICATION NO. | : 10/830661 |
| DATED | : April 20, 2010 |
| INVENTOR(S) | : Nils Gura et al. |

It is certified that error appears in the above-identified patent and that said Letters Patent is hereby corrected as shown below:

In column 4, line 42, delete "0.5," and insert -- 0.5 --, therefor.

In column 8, line 37, in claim 4, delete "1," and insert -- claim 1, --, therefor.

In column 9, line 10, in claim 14, delete "comprising;" and insert -- comprising: --, therefor.

In column 9, line 28, in claim 15, delete "transactions:" and insert -- transactions; --, therefor.

Signed and Sealed this
Twelfth Day of April, 2011

David J. Kappos
*Director of the United States Patent and Trademark Office*